United States Patent [19]
Li

[11] Patent Number: 5,989,687
[45] Date of Patent: Nov. 23, 1999

[54] INKJET PRINTING MEDIA COMPRISING THE POLYMERIZATION REACTION PRODUCT OF THE HYDROLYZATE OF AN ALUMINUM ALKOXIDE AND AN ORGANOALKOXYSILANE

[75] Inventor: Huawen Li, Delmont, Pa.

[73] Assignee: PPG Industries Ohio, Inc., Cleveland, Ohio

[21] Appl. No.: 08/987,224

[22] Filed: Dec. 9, 1997

[51] Int. Cl.$^6$ ....................................................... B32B 3/00
[52] U.S. Cl. ...................... 428/195; 428/320.2; 427/152; 427/153; 524/503; 524/506; 524/266
[58] Field of Search ................................. 428/195, 320.2, 428/914; 427/152, 153, 387, 262; 524/506, 503, 266

[56] References Cited

U.S. PATENT DOCUMENTS

| | | | |
|---|---|---|---|
| 3,312,569 | 4/1967 | Philipps et al. | 117/126 |
| 3,904,802 | 9/1975 | Brown et al. | 428/320 |
| 4,043,953 | 8/1977 | Chang et al. | 260/18 |
| 4,731,264 | 3/1988 | Lin et al. | 427/387 |
| 4,743,503 | 5/1988 | Lin et al. | 428/353 |
| 4,753,827 | 6/1988 | Yoldas et al. | 427/387 |
| 4,754,012 | 6/1988 | Yoldas et al. | 528/10 |
| 4,799,963 | 1/1989 | Basil et al. | 106/287.13 |
| 4,814,017 | 3/1989 | Yoldas et al. | 106/287.12 |
| 5,045,396 | 9/1991 | Lin et al. | 428/412 |

FOREIGN PATENT DOCUMENTS

| | | |
|---|---|---|
| 0 078 548 | 5/1983 | European Pat. Off. . |
| 0 263 428 | 4/1988 | European Pat. Off. . |
| 0 486 469B1 | 5/1992 | European Pat. Off. . |
| 01141783 | 6/1989 | Japan . |
| 06297830 | 10/1994 | Japan . |
| 09175000 | 7/1997 | Japan . |
| WO 97 22476 | 6/1997 | WIPO . |

OTHER PUBLICATIONS

Derwent Abstract of JP 07126857, May 16 1995.
ACS Abstract of EP 0 357 176 A2, Mar. 7, 1990.
ACS Abstract of JP 01119519, May 11, 1989.
ACS Abstract of JP 6152369, Mar. 15, 1986.
ACS Abstract of JP 7681877, Jul. 17, 1976.
ACS Abstract of Mater. Res. Soc. Symp. Proc., vol. 346, pp. 915–921 (1994).
ACS Abstract of Polym. Prepr., vol. 34, pp. 248–249 (1993).
ACS Abstract of J. Non–Cryst. Solids, vol. 109, pp. 198–210 (1989).
ACS Abstract of Proc. SPIE–Int. Soc. Opt. Eng., vol. 683, pp. 19–24 (1986).
A. W. Abbott et al, Synthesis and Characterization of Tri-ethylsiloxy–Substituted Alumoxanes: Their Structural Relationship to the Minerals Boehmite and Diaspore, Chem. Mater, vol. 4. pp. 167–182 (1992).
R. Kasemann et al, A New Type of a Sol–Gel–Derived Inorganic–Organic Nanocomposite, Mat. Res. Soc. Symp. Prac., vol. 346, pp. 915–921 (1994).

Primary Examiner—William Krynski
Assistant Examiner—Hong J. Xu
Attorney, Agent, or Firm—George D. Morris

[57] ABSTRACT

A printing medium comprising a substrate having at least one surface and a coating adhered to the surface wherein the coating comprises (a) binder comprising film-forming organic polymer, and (b) the polymerization reaction product of the hydrolyzate of an aluminum alkoxide and an organoalkoxysilane.

24 Claims, No Drawings

INKJET PRINTING MEDIA COMPRISING THE POLYMERIZATION REACTION PRODUCT OF THE HYDROLYZATE OF AN ALUMINUM ALKOXIDE AND AN ORGANOALKOXYSILANE

When substrates coated with an ink-receiving coating are printed with inkjet printing inks and dried, the inks often later migrate from their original locations on the coated substrate, thereby resulting in unsatisfactory images. Such migration is known as "bleed" or "bloom" and is especially prevalent under conditions of high temperature and high humidity such as for example, 35° C. and 80 percent relative humidity.

It has now been found that bleed can be substantially reduced if the coating contains the polymerization reaction product of the hydrolyzate of an aluminum alkoxide and an organoalkoxysilane.

Accordingly, one embodiment of the invention is a coating composition comprising: a coating composition comprising: (a) a volatile aqueous liquid medium; (b) binder comprising film-forming water-soluble organic polymer dissolved in the volatile aqueous liquid medium, film-forming water-dispersible organic polymer dispersed in the volatile aqueous liquid medium, or a mixture thereof; (c) the polymerization reaction product of the hydrolyzate of an aluminum alkoxide and an organoalkoxysilane of the formula:

$$R_xSi(OR')_y(OH)_z$$

wherein: (1) the hydrolyzate is in the form of finely divided substantially water-insoluble hydrated alumina particles having the empirical formula AlO(OH), which particles have a maximum dimension of less than 500 nanometers, and (2) R is an organic radical, R' is a low molecular weight alkyl radical, x is in the range of from 1 to 3, y is in the range of from 1 to 3, z is in the range of from 0 to 2, and (x+y+z)=4.

Another embodiment of the invention is a printing medium comprising a substrate having at least one surface and a coating adhered to the surface wherein the coating comprises: (a) binder comprising organic polymer, and (b) the polymerization reaction product of the hydrolyzate of an aluminum alkoxide and an organoalkoxysilane of the formula:

$$R_xSi(OR')_y(OH)_z$$

wherein: (1) R is an organic radical, R' is a low molecular weight alkyl radical, and x is in the range of from 1 to 3, y is in the range of from 1 to 3, z is in the range of from 0 to 2, and (x+y+z)=4, (2) the hydrolyzate is in the form of finely divided substantially water-insoluble hydrated alumina particles having the empirical formula AlO(OH), which particles have a maximum dimension of less than 500 nanometers, and (3) the polymerization reaction product is distributed throughout the binder.

Yet another embodiment of the invention is a printing process which comprises applying liquid ink droplets to the printing medium of the second embodiment.

In the interest of brevity, the polymerization reaction product of the hydrolyzate of an aluminum alkoxide and an organoalkoxysilane as described above will sometimes be referred to as "the silanized hydrolyzate".

The printing media of the invention may be made by coating a surface of a substrate with the coating composition of the invention and thereafter substantially removing the aqueous liquid medium.

The coating composition can be in the form of an aqueous solution in which case the volatile aqueous liquid medium is a volatile aqueous solvent for the polymer of the binder, or the coating composition can be in the form of an aqueous dispersion in which instance the volatile aqueous liquid medium is a volatile aqueous dispersion liquid for at least some of the polymer of the binder.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the coating compositions of the invention and which become components of the volatile aqueous liquid medium, may be present at low concentrations.

In most instances water constitutes at least 80 percent by weight of the volatile aqueous liquid medium. Often water constitutes at least 95 percent by weight of the volatile aqueous liquid medium. Preferably water constitutes substantially all of the volatile aqueous liquid medium.

The amount of volatile aqueous liquid medium present in the coating composition may vary widely. The minimum amount is that which will produce a coating composition having a viscosity low enough to apply as a coating. The maximum amount is not governed by any theory, but by practical considerations such as the cost of the liquid medium, the minimum desired thickness of the coating to be deposited, and the cost and time required to remove the volatile aqueous liquid medium from the applied wet coating. Usually, however, the volatile aqueous liquid medium constitutes from 60 to 98 percent by weight of the coating composition. In many cases the volatile aqueous liquid medium constitutes from 70 to 96 percent by weight of the coating composition. Often the volatile aqueous liquid medium constitutes from 75 to 95 percent by weight of the coating composition. Preferably the volatile aqueous liquid medium constitutes from 80 to 95 percent by weight of the composition.

The organic polymers which may be used in the present invention are numerous and widely varied. Examples include water-soluble poly(ethylene oxide), water-soluble poly(vinyl alcohol), water-soluble poly(vinyl pyrrolidone), water-soluble cellulosic organic polymer, water-dispersed polymer, or a mixture of two or more thereof.

Water-soluble poly(ethylene oxide) is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1), diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5], trimethylolpropane [CAS 77-99-6], and α,ω-diaminopoly(propylene glycol) [CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and non-dispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the poly(ethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly(ethylene oxide) polymer unsuitable for its purpose. In most cases the poly(ethylene oxide) is water-soluble. The preferred poly(ethylene oxide) is a water-soluble homopolymer of ethylene oxide produced using a small amount of ethylene glycol as an initiator.

The weight average molecular weight of the water-soluble poly(ethylene oxide) may vary widely. Usually it is in the range of from 100,000 to 3,000,000 although a weight average molecular weights somewhat below 100,000 or somewhat above 3,000,000 may be used. Often the weight average molecular weight of the water-soluble poly(ethylene oxide) is in the range of from 150,000 to 1,000,000. Frequently the weight average molecular weight of the water-soluble poly(ethylene oxide) is in the range of from 200,000 to 1,000,000. From 300,000 to 700,000 is preferred.

Water-soluble poly(vinyl alcohol) may be broadly classified as one of two types. The first type is fully hydrolyzed water-soluble poly(vinyl alcohol) in which less than 1.5 mole percent acetate groups are left on the molecule. The second type is partially hydrolyzed water-soluble poly(vinyl alcohol) in which from 1.5 to as much as 20 mole percent acetate groups are left on the molecule. The water-soluble organic polymer may comprise either type or a mixture of both. The weight average molecular weight of the water-soluble poly(vinyl alcohol) may vary considerably, but often it is in the range of from 100,000 to 400,000. In many cases the weight average molecular weight is in the range of from 110,000 to 300,000. From 120,000 to 200,000 is preferred.

Water-soluble poly(vinylpyrrolidone) is a known material and may be used. Usually, but not necessarily, the weight average molecular weight of the poly(vinylpyrrolidone) is in the range of from 5000 to 3,000,000. From 10,000 to 1,000,000 is preferred.

There are many widely varying types of water-soluble cellulosic organic polymers which may be employed in the present invention. Of these, the water-soluble cellulose ethers are preferred water-soluble cellulosic organic polymers. Many of the water-soluble cellulose ethers are also excellent water retention agents. Examples of the water-soluble cellulose ethers include water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose (CAS 9004-64-2], water-soluble hydroxybutylcellulose [CAS 37208-08-5], water-soluble hydroxybutylmethylcellulose [CAS 9041-56-9] and water-soluble cellulose sulfate sodium salt [CAS 9005-22-5]. Water-soluble hydroxypropylcellulose is preferred.

Water-soluble hydroxypropylcellulose is a known material and is available commercially in several different weight average molecular weights. The weight average molecular weight of the water-soluble hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble hydroxypropylcelluloses having different weight average molecular weights may be admixed to obtain a water-soluble hydroxypropylcellulose having a differing weight average molecular weight.

Similarly, there are many widely varying kinds of other polymers which may be employed in the present invention. Examples include water-soluble poly(vinylpyridine), water-soluble poly(ethylenimine), water-soluble ethoxylated poly (ethylenimine), water-soluble poly(ethylenimine)-epichlorohydrin, water-soluble polyacrylate, water-soluble sodium polyacrylate, water-soluble poly(acrylamide), water-soluble carboxy modified poly(vinyl alcohol), water-soluble poly(2-acrylamido-2-methylpropane sulfonic acid), water-soluble poly(styrene sulfonate), water-soluble vinyl methyl ether/maleic acid copolymer, water-soluble styrene-maleic anhydride copolymer, water-soluble ethylene-maleic anhydride copolymer, water-soluble acrylamide/acrylic acid copolymer, water-soluble poly(diethylene triamine-co-adipic acid), water-soluble poly[(dimethylamino)ethyl methacrylate hydrochloride], water-soluble quaternized poly(imidazoline), water-soluble poly(N,N-dimethyl-3,5-dimethylene piperidinium chloride), water-soluble poly (vinylpyridinium halide), water-soluble starch, water-soluble oxidized starch, water-soluble casein, water-soluble gelatin, water-soluble sodium alginate, water-soluble carrageenan, water-soluble dextran, water-soluble gum arabic, water-soluble pectin, water-soluble albumin, water-soluble agar-agar and water-dispersed polymers such as water-dispersed poly(ethylene-co-acrylic acid) or water-dispersed cationic acrylic polymer.

There are many widely varying types of water-soluble ethylenically unsaturated organic polymers which may be employed in the present invention. In most instances the ethylenic unsaturation is provided by acryloyl groups, methacryloyl groups, allyl groups, vinyl groups, fumaroyl groups, and maleoyl groups. Examples of such polymers which may be used include the water-soluble polyacrylates, polymethacrylates, polyfumarates, and polymaleates of low, medium, or high molecular weight water-soluble poly (ethylene oxides). Of particular importance are water-soluble poly(ethylene oxide) diacrylate [CAS 26570-48-9], water-soluble poly(ethylene oxide) dimethacrylate [CAS 25852-47-5], and water-soluble poly(ethylene oxide) dimaleate (CAS 36247-43-5]. Other examples are the water-soluble poly(vinyl alcohols) in which the hydrogens of some of the hydroxyl groups have been replaced with acryloyl or methacryloyl groups. Yet other examples include water-soluble or water-dispersible materials formed by chain extending a central unit with oxy-1,2-ethanediyl groups and terminating with acryloyl or methacryloyl groups. Examples of central groups which may be used include the oxy-1,2-ethanediyl extended aliphatic or aromatic diols, triols, and tetrols, such as for example, trimethylolpropane, glycerine, bisphenol A, propylene glycol, and pentaerythritol.

Water-soluble organic polymers which contain one ethylenically unsaturated group per molecule may be present. In most instances the ethylenic unsaturation is provided by acryloyl groups, methacryloyl groups, allyl groups, vinyl groups, fumaroyl groups, and maleoyl groups. Examples of such polymers include the water-soluble monoacrylates, monomethacrylates, monofumarates, and monomaleates of the water-soluble poly(ethylene oxides) and the oxy-1,2-ethanediyl extended aliphatic or aromatic diols, triols, and tetrols described above. Of particular importance are water-soluble poly(ethylene oxide) monoacrylate [CAS 26403-58-7], water-soluble poly(ethylene oxide) monomethacrylate [CAS 25736-86-1], and water-soluble poly(ethylene oxide) monomaleate [CAS 37916-19-1].

As a component of the binder of the coating or coating composition as the case may be, the amount of organic polymer may vary considerably. Usually the organic polymer constitutes from 60 to 100 percent by weight of the binder. Often the organic polymer constitutes from 80 to 100 percent by weight of the binder. From 90 to 100 percent by weight of the binder is preferred.

The binder constitutes from 20 to 90 percent by weight of the solids of the coating composition. In many cases the binder constitutes from 25 to 75 percent by weight of the solids of the coating composition. From 35 to 70 percent by weight is preferred.

Similarly, the binder constitutes from 20 to 90 percent by weight of the dry coating. Often the binder constitutes from 25 to 75 percent by weight of the dry coating. From 35 to 70 percent by weight is preferred.

Polymer constituting some or all of the binder of the coating may or may not be insolubilized after application of the coating composition to the substrate. As used herein and in the claims, insolubilized organic polymer is organic polymer which is water-soluble or water-dispersed when applied to the substrate and which is completely or partially insolubilized after such application. Insolubilization may be accomplished through use of insolubilizer. Insolubilizers generally function as crosslinking agents. Preferably the insolubilizer reacts with functional groups of at least a portion of the organic polymer to provide the desired degree of Insolubilization to the total organic polymer of the coating.

There are many available insolubilizers which may optionally be used. Examples of suitable insolubilizers include, but are not limited to, Curesan® 199 insolubilizer (PPG Industries, Inc., Pittsburgh, Pa.), Curesan® 200 insolubilizer (PPG Industries, Inc.), Sequarez® 700C insolubilizer (Sequa Chemicals, Inc., Chester, S.C.), Sequarez® 700M insolubilizer (Sequa Chemicals Inc.), Sequarez® 755 insolubilizer (Sequa Chemicals, Inc.), Sequarez® 770 insolubilizer (Sequa Chemicals, Inc.), Berset® 39 insolubilizer (Bercen Inc., Cranston, R.I.), Berset® 47 insolubilizer (Bercen Inc.), Berset® 2185 insolubilizer (Bercen Inc.), and Berset® 2586 insolubilizer (Bercen Inc.).

When used, the amount of insolubilizer present in the binder of the coating composition may vary considerably. In such instances the weight ratio of the insolubilizer to the polymer of the binder is usually in the range of from 0.05:100 to 15:100. Often the weight ratio is in the range of from 1:100 to 10:100. From 2:100 to 5:100 is preferred. These ratios are on the basis of insolubilizer dry solids and polymer dry solids.

The polymerization reaction product of a hydrolyzate of an aluminum alkoxide and an organoalkoxysilane of the formula:

$$R_xSi(OR')_y(OH)_z$$

wherein R is an organic radical, R' is a low molecular weight alkyl radical, x is in the range of from 1 to 3, y is in the range of from 1 to 3, z is in the range of from 0 to 2, and (x+y+z)=4, is itself known and is described in detail, together with the manner in which it may be made, in U.S. Pat. No. 4,731,264 and European Patent Application Publication No. 0 263 428 A2, the entire disclosures of which are incorporated herein by reference.

Briefly, the hydrolyzate of an aluminum alkoxide is first formed. Usually the hydrolyzate is in the form of finely divided substantially water-insoluble hydrated alumina particles having the empirical formula AlO(OH). In many instances the hydrolyzate of an aluminum alkoxide is in the form of finely divided substantially water-insoluble pseudoboehmite particles. The preparation of hydrolyzate of an aluminum alkoxide of the pseudoboehmite type is also described by B. E. Yoldas in *The American Ceramic Society Bulletin*, Vol. 54, No. 3, (March 1975), pages 289–290, in *Journal of Applied Chemical Biotechnology*, Vol. 23 (1973), pages 803–809, and in *Journal of Materials Science*, Vol. 10 (1975), pages 1856–1860, the entire disclosures of which are incorporated herein by reference. Briefly, aluminum isopropoxide or aluminum secondary-butoxide are hydrolyzed in an excess of water with vigorous agitation at from 75° C. to 80° C. to form a slurry of aluminum monohydroxide. The aluminum monohydroxide is then peptized at temperatures of at least 80° C. with an acid to form a clear pseudoboehmite sol which exhibits the Tyndall effect when illuminated with a narrow beam of light. Since the pseudoboehmite of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. In most instances the pseudoboehmite is transparent and colorless.

The pseudoboehmite particles have a maximum dimension of less than 500 nanometers. Often the pseudoboehmite particles have a maximum dimension of less than 100 nanometers. Frequently the maximum dimension is less than 50 nanometers. Preferably the maximum dimension is less than 20 nanometers.

As used herein and in the claims the maximum dimension of the pseudoboehmite particles is determined by transmission electron microscopy.

After preparation of the alumina sol, an organoalkoxysilane (which may optionally be previously partially hydrolyzed) is added. The organoalkoxysilane reacts with the hydrolyzed alumina sol to form a silicon-oxygen-aluminum network. In an aqueous alumina sol, the most of the remaining alkoxy groups of the organoalkoxysilane are hydrolyzed to form silanol groups, some of which may condense.

Various organoalkoxysilanes may be used in accordance with the present invention. Organoalkoxysilanes of the formula $$R_xSi(OR')_y(OH)_z$$

wherein R is an organic radical, R' is a low molecular weight alkyl radical, x is in the range of from 1 to 3, y is in the range of from 1 to 3, z is in the range of from 0 to 2, and (x+y+z)=4, is itself known. R is preferably selected from the group consisting of alkyl, vinyl, methoxyethyl, phenyl, γ-glycidyloxypropyl, γ-methacrylyloxypropyl, 3-aminopropyl, and mixtures thereof. In most instances each R' independently contains from 1 to 6 carbon atoms. Preferably each R' is independently methyl, ethyl, n-propyl, or isopropyl. Methyl or ethyl is especially preferred.

The reaction between the hydrolyzate of an aluminum alkoxide and the organoalkoxysilane is usually carried out at temperatures in the range of from 4° C. to 80° C. Often the temperatures are in the range of from 10° C. to 60° C. From 20° C. to 30° C. is preferred.

The polymerization reaction product of a hydrolyzate of an aluminum alkoxide and an organoalkoxysilane is particulate. The particles of the polymerization reaction product have a maximum dimension of less than 500 nanometers. Often the polymerization reaction product particles have a maximum dimension of less than 100 nanometers. Frequently the maximum dimension is less than 50 nanometers. Preferably the maximum dimension is less than 20 nanometers.

As used herein and in the claims the maximum dimension of the polymerization reaction product of a hydrolyzate of an aluminum alkoxide and an organoalkoxysilane is determined by transmission electron microscopy.

The amount of the polymerization reaction product of a hydrolyzate of an aluminum alkoxide and an organoalkoxysilane in the coating or in the solids of the coating composition, as the case may be, may vary widely. The polymerization reaction product constitutes from 2 to 80 percent by weight of the coating or of the solids of the coating composition. In many cases the polymerization reaction product constitutes from 10 to 65 percent by weight of the coating or of the solids of the coating composition. From 15 to 45 percent by weight is preferred. As used herein and in the claims, "solids of the coating composition" is the residue remaining after the solvent and any other volatile materials have been substantially removed from the coating composition by drying to form a coating in accordance with good coatings practice.

The polymerization reaction product of a hydrolyzate of an aluminum alkoxide and an organoalkoxysilane and the binder together usually constitute from 2 to 40 percent by weight of the coating composition. Frequently such polymerization reaction product and the binder together constitute from 4 to 30 percent by weight of the coating composition. Often such polymerization reaction product and the binder together constitute from 5 to 25 percent by weight of the coating composition. Preferably such polymerization reaction product and the binder together constitute from 5 to 20 percent by weight of the coating composition.

A material which may optionally be present in the coating composition is surfactant. For purposes of the present specification and claims surfactant is considered not to be a part of the binder. There are many available surfactants and combinations of surfactants which may be used. Examples of suitable surfactants include, but are not limited to, Fluorad® FC-170-C surfactant (3M Company), and Triton® X-405 surfactant (Union Carbide Corporation).

When used, the amount of surfactant present in the coating composition may vary considerably. In such instances the weight ratio of the surfactant to the binder is usually in the range of from 0.01:100 to 10:100. In many instances the weight ratio is in the range of from 0.1:100 to 10:100. Often the weight ratio is in the range of from 0.2:100 to 5:100. From 0.5:100 to 2:100 is preferred. These ratios are on the basis of surfactant dry solids and binder dry solids.

There are many other conventional adjuvant materials which may optionally be present in the coating composition. These include such materials as lubricants, waxes, plasticizers, antioxidants, organic solvents, lakes, pigments, free radical initiators, photoinitiators, and photosensitizers. The listing of such materials is by no means exhaustive. These and other ingredients may be employed in their customary amounts for their customary purposes so long as they do not seriously interfere with good coating composition formulating practice.

The pH of the coating composition may vary considerably. In most instances the pH is in the range of from 3 to 7. Often the pH is in the range of from 3.5 to 6.

The coating compositions are usually prepared by simply admixing the various ingredients. The ingredients may be mixed in any order. Although the mixing of liquid and solids is usually accomplished at room temperature, elevated temperatures are sometimes used. The maximum temperature which is usable depends upon the heat stability of the ingredients.

The coating compositions are generally applied to the surface of the substrate using any conventional technique known to the art. These include spraying, curtain coating, dipping, rod coating, blade coating, roller application, size press, printing, brushing, drawing, slot-die coating, and extrusion. The coating is then formed by removing the solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the substrate, the solvent is substantially removed, usually by drying. If the coating contains ethylenically unsaturated polymer, some or all of the ethylenically unsaturated groups may be polymerized to form crosslinks in the any of a number of ways, as for example, by heating, by exposure to actinic radiation, by exposure to ionizing radiation, or by exposure to plasma.

The substrate may be any substrate at least one surface of which is capable of bearing the coating discussed above. In most instances the substrate is in the form of an individual sheet or in the form of a roll, web, strip, film, or foil of material capable of being cut into sheets.

The substrate may be porous throughout, it may be nonporous throughout, or it may comprise both porous regions and nonporous regions.

Examples of porous substrates include paper, paperboard, wood, cloth, nonwoven fabric, felt, unglazed ceramic material, microporous polymer membranes, microporous membranes comprising both polymer and filler particles, porous foam, and microporous foam.

Examples of substrates which are substantially nonporous throughout include sheets or films of organic polymer such as poly(ethylene terephthalate), polyethylene, polypropylene, cellulose acetate, poly(vinyl chloride), and copolymers such as saran. The sheets or films may be filled or unfilled. The sheets or films may be metallized or unmetallized as desired. Additional examples include metal substrates including but not limited to metal foils such as aluminum foil and copper foil. Yet another example is a porous or microporous foam comprising thermoplastic organic polymer which foam has been compressed to such an extent that the resulting deformed material is substantially nonporous. Still another example is glass.

Base stocks which are normally porous such as for example paper, paperboard, wood, cloth, nonwoven fabric, felt, unglazed ceramic material, microporous polymer membranes, microporous membranes comprising both polymer and filler particles, porous foam, or microporous foam may be coated or laminated to render one or more surfaces substantially nonporous and thereby provide substrates having at least one substantially nonporous surface.

The substrate may be substantially transparent, it may be substantially opaque, or it may be of intermediate transparency. For some applications such as inkjet printed overhead slides, the substrate must be sufficiently transparent to be useful for that application. For other applications such as inkjet printed paper, transparency of the substrate is not so important.

The thickness of the coating may vary widely, but in most instances the thickness of the coating is in the range of from 1 to 40 μm. In many cases the thickness of the coating is in the range of from 5 to 40 μm. Often the thickness is in the range of from 8 to 30 μm. From 10 to 18 μm is preferred.

The coating may be substantially transparent, substantially opaque, or of intermediate transparency. It may be substantially colorless, it may be highly colored, or it may be of an intermediate degree of color. Usually the coating is substantially transparent and substantially colorless. As used herein and in the claims, a coating is substantially transparent if its luminous transmission in the visible region is at least 80 percent of the incident light. Often the luminous transmission of the coating is at least 85 percent of the incident light. Preferably the luminous transmission of the coating is at least 90 percent. Also as used herein and in the claims, a coating is substantially colorless if the luminous transmission is substantially the same for all wavelengths in the visible region, viz., 400 to 800 nanometers.

Optionally the above-described coatings may be overlaid with an overcoating comprising ink-receptive organic film-forming polymer. The overcoating may be formed by applying an overcoating composition comprising a liquid medium and ink-receptive organic film-forming polymer dissolved or dispersed in the liquid medium and removing the liquid medium, as for example, by drying. Preferably the liquid medium is an aqueous solvent and the ink-receptive organic film-forming polymer is water-soluble poly(ethylene oxide) having a weight average molecular weight in the range of from 100,000 to 3,000,000, both of which have been described above in respect of earlier described embodiments of the invention. Water is an especially preferred aqueous solvent.

The relative proportions of liquid medium and organic film-forming polymer present in the overcoating composition may vary widely. The minimum proportion is that which will produce an overcoating composition having a viscosity low enough to apply as an overcoating. The maximum proportion is not governed by any theory, but by practical considerations such as the cost of the liquid medium and the cost and time required to remove the liquid medium from the applied wet overcoating. Usually, however, the weight ratio of liquid medium to film-forming organic polymer is from 18:1 to 50:1. Often the weight ratio is from 19:1 to 40:1. Preferably weight ratio is from 19:1 to 24:1.

Optional ingredients such as those discussed above may be present in the overcoating composition when desired.

The overcoating composition may be prepared by admixing the ingredients. It may be applied and dried using any of the coating and drying techniques discussed above. When an overcoating composition is to be applied, it may be applied once or a multiplicity of times.

The invention is further described in conjunction with the following example which is to be considered illustrative rather than limiting, and in which all parts are parts by weight and all percentages are percentages by weight unless otherwise specified.

EXAMPLE 1

One hundred forty grams of Disperal P2 pseudoboehmite powder (Condea Chemie GmbH) (produced by the hydrolysis of aluminum alkoxide) was gradually added to 860 grams of 0.25 percent nitric acid aqueous solution with stirring. The mixture was stirred until a translucent pseudoboehmite composition was obtained.

A reaction flask was charged with 93.6 grams of the above translucent pseudoboehmite composition and 4 grams of dimethyldiethoxysilane (PCR Inc.). The mixture was stirred for 2 hours at ambient room temperature to form a silanized pseudoboehmite composition.

A poly(ethylene oxide) solution was prepared by dissolving 60 grams of Alkox E-30 poly(ethylene oxide) having a weight average molecular weight of about 300,000 to 450,000 (Meisei Chemical Works, Ltd.) in 940 grams of deionized water.

The charges shown in Table 1 were used in the preparation of an aqueous secondary cationic polymer composition.

TABLE 1

| Ingredients | Weight, kilograms |
|---|---|
| Charge 1 | |
| Methyl ethyl ketone | 55.93 |
| Charge 2 | |
| Methyl ethyl ketone | 28.67 |
| Initiator[1] | 10.16 |
| Charge 3 | |
| n-Butyl acrylate | 30.44 |
| Methyl methacrylate | 87.32 |
| 2-(tert-Butylamino) ethyl methacrylate [CAS 3775-90-4] | 40.64 |
| Styrene | 44.68 |
| Charge 4 | |
| Methyl ethyl ketone | 2.27 |
| Charge 5 | |
| Methyl ethyl ketone | 2.27 |
| Charge 6 | |
| Glacial acetic acid | 9.89 |
| Methyl ethyl ketone | 2.27 |
| Charge 7 | |
| Deionized water | 579.1 |
| Charge 8 | |
| Deionized water | 11.1 |

[1]VAZO ® 67 2,2'-Azobis (2-methylbutanenitrile) initiator, E. I. du Pont de Nemours and Company, Wilmington, Delaware.

Charge 1 was heated in a reactor with agitation to reflux temperature (80° C.). The addition of Charge 2 from a catalyst tank to the reactor was then begun. The addition of Charge 2 was made over a period of 305 minutes. Five minutes after beginning the addition of Charge 2, the addition of Charge 3 from a monomer tank was begun. The addition of Charge 3 was made over a period of 240 minutes.

When the addition of Charge 3 was completed, Charge 4 was added to the monomer tank as a rinse and then the rinse liquid was added from the monomer tank to the reactor over a period of 10 minutes. Upon completion of the addition of Charge 2, Charge 5 was added to the catalyst tank as a rinse and then the rinse liquid was added from the catalyst tank to the reactor over a period of 10 minutes. The reaction mixture was then agitated at reflux for three hours while the temperature of the reaction mixture was in the range of from 83° C. to 86° C. At the end of the three hour period, the reaction mixture was cooled to temperatures in the range of from 48° C. to 52° C. Charge 6 was added over a period of 10 minutes and the reaction mixture was thereafter agitated for 15 minutes. Charge 7 was added to a thinning tank equipped for distillation and heated to temperatures in the range of from 48° C. to 52° C. The reaction mixture was dropped from the reactor to the thinning tank as quickly as possible. Charge 8 was added to the reactor as a rinse and then the rinse liquid was also dropped to the thinning tank. The contents of the thinning tank were agitated for 30 minutes at temperatures in the range of from 48° C. to 52° C. Over a thirty minute period the pressure was reduced to 71.3 kilopascals, absolute. The temperature was then increased and liquid was stripped off under vacuum until the solids content of the batch was about 30 percent by weight. The resulting product which was an aqueous secondary cationic polymer composition, was cooled to about 48° C., filtered, and then discharged into drums.

The charges shown in Table 2 were used in the preparation of an aqueous quaternary cationic polymer composition.

TABLE 2

| Ingredients | Weight, grams |
|---|---|
| Charge 1 | |
| Isopropanol | 100.0 |
| Charge 2 | |
| Isopropanol | 106.5 |
| Initiator[1] | 18.2 |
| Charge 3 | |
| Isopropanol | 205.7 |
| Styrene | 182.5 |
| Aqueous quaternary monomer[2] | 243.3 |
| Charge 4 | |
| Deionized Water | 790 |

[1]VAZO ® 67 2,2'-Azobis (2-methylbutanenitrile) initiator, E. I. du Pont de Nemours and Company, Wilmington, Delaware.
[2]75% [2-(methacryloyloxy)ethyl]trimethyl ammonium chloride, 25% water, by weight.

Charge 1 was heated in a reactor with agitation to reflux (77° C. to 80° C.). At reflux, Charge 2 was added over a period of 3 hours. After Charge 2 had been added, the addition of Charge 3 was begun. Charge 3 was added over a period of 3 hours. Charge 4 was added to the catalyst tank and the monomer tank as a rinse and used for further additions of deionized water. Upon completion of the additions of Charge 2 and Charge 3, the reaction mixture was agitated at reflux for 4 hours. The reactor was then set for total distillation. About 300 grams of deionized water was added to the reactor, the jacket temperature was reduced, and vacuum was applied slowly. Vacuum distillation was begun. After collecting 491 grams of distillates, an additional 490 grams of deionized water was added and vacuum distillation was continued. After most of the isopropanol had been removed, the percent solids was determined and the product was adjusted to 29.5 percent solids (as determined by weight difference of a sample before and after heating at 110° C. for one hour) using deionized water. The product which was an aqueous quaternary cationic polymer composition, was filtered through a micrometer glass fiber filter.

To 200 grams of the above poly(ethylene oxide) solution were added 50 grams of deionized water, 16.7 grams of the above aqueous secondary cationic polymer composition, and 18 grams of the above aqueous quaternary cationic polymer composition. The mixture was stirred until a homogeneous composition was obtained, then all of the above silanized pseudoboehmite composition was added. The mixture was stirred for 30 minutes. At the end of this period, 0.24 gram of Fluorad® FC-170C surfactant (3M Company) was added and the mixture was stirred for 5 minutes to form a coating composition.

Portions of the coating composition were applied to poly (ethylene terephthalate) transparencies with a Meyer Rod #120 and dried in an oven at 115° C. for 4.5 minutes. The dry coatings were about 12 μm in thickness.

The coated transparencies were then printed on the coated side using a Hewlett-Packard 870 inkjet printer. The printed transparencies showed excellent print quality.

Although the present invention has been described with reference to specific details of certain embodiments thereof, it is not intended that such details should be regarded as limitations upon the scope of the invention except insofar as they are included in the accompanying claims.

I claim:

1. A coating composition comprising:
   (a) a volatile aqueous liquid medium;
   (b) binder comprising film-forming water-soluble organic polymer dissolved in the volatile aqueous liquid medium, film-forming water-dispersible organic polymer dispersed in the volatile aqueous liquid medium, or a mixture thereof; and
   (c) the polymerization reaction product of the hydrolyzate of an aluminum alkoxide and an organoalkoxysilane of the formula:

$R_xSi(OR')_y(OH)_z$ wherein:
   (1) the hydrolyzate is in the form of finely divided substantially water-insoluble hydrated alumina particles having the empirical formula AlO(OH), which particles have a maximum dimension of less than 500 nanometers, and
   (2) R is an organic radical, R' is a low molecular weight alkyl radical, x is in the range of from 1 to 3, y is in the range of from 1 to 3, z is in the range of from 0 to 2, and (x+y+z)=4.

2. The coating composition of claim 1 wherein water constitutes at least 80 percent by weight of the volatile aqueous liquid medium.

3. The coating composition of claim 1 wherein the binder comprises film-forming water-soluble organic polymer dissolved in the volatile aqueous liquid medium.

4. The coating composition of claim 3 wherein the film-forming water-soluble organic polymer comprises water-soluble poly(ethylene oxide), water-soluble poly(vinyl alcohol), water-soluble poly(vinyl pyrrolidone), water-soluble cellulosic organic polymer, or a mixture of two or more thereof.

5. The coating composition of claim 1 wherein the hydrolyzate is in the form of finely divided substantially water-insoluble pseudoboehmite particles which have a maximum dimension of less than 500 nanometers.

6. The coating composition of claim 5 wherein the pseudoboehmite particles have a maximum dimension of less than 100 nanometers.

7. The coating composition of claim 5 wherein the pseudoboehmite particles have a maximum dimension of less than 50 nanometers.

8. The coating composition of claim 1 wherein R is selected from the group consisting of alkyl, vinyl, methoxyethyl, phenyl, γ-glycidyloxypropyl, γ-methacrylyloxypropyl, 3-aminopropyl, and mixtures thereof.

9. The coating composition of claim 1 wherein each R' is independently methyl, ethyl, n-propyl, or isopropyl.

10. The coating composition of claim 1 wherein the polymerization reaction product constitutes from 2 to 80 percent by weight of the solids of the coating composition.

11. The coating composition of claim 1 wherein the polymerization reaction product and the binder together constitute from 2 to 40 percent by weight of the coating composition.

12. The coating composition of claim 1 wherein the volatile aqueous liquid medium constitutes from 60 to 98 percent by weight of the coating composition.

13. A printing medium comprising a substrate having at least one surface and a coating adhered to the surface wherein the coating comprises:

(a) binder comprising organic polymer, and (b) the polymerization reaction product of the hydrolyzate of an aluminum alkoxide and an organoalkoxysilane of the formula:

$$R_xSi(OR')_y(OH)_z$$

wherein:
(1) R is an organic radical, R' is a low molecular weight alkyl radical, and x is in the range of from 1 to 3, y is in the range of from 1 to 3, z is in the range of from 0 to 2, and (x+y+z)=4, (2) the hydrolyzate is in the form of finely divided substantially water-insoluble hydrated alumina particles having the empirical formula AlO(OH), which particles have a maximum dimension of less than 500 nanometers, and (3) the polymerization reaction product is distributed throughout the binder.

14. The printing medium of claim 13 wherein the organic polymer comprises poly(ethylene oxide), poly(vinyl alcohol), poly(vinyl pyrrolidone), cellulosic organic polymer, or a mixture of two or more thereof.

15. The printing medium of claim 13 wherein the hydrolyzate is in the form of finely divided substantially water-insoluble pseudoboehmite particles which have a maximum dimension of less than 500 nanometers.

16. The printing medium of claim 15 wherein the pseudoboehmite particles have a maximum dimension of less than 100 nanometers.

17. The printing medium of claim 15 wherein the pseudoboehmite particles have a maximum dimension of less than 50 nanometers.

18. The printing medium of claim 13 wherein R is selected from the group consisting of alkyl, vinyl, methoxyethyl, phenyl, γ-glycidyloxypropyl, γ-methacrylyloxypropyl, 3-aminopropyl, and mixtures thereof.

19. The printing medium of claim 13 wherein each R' is independently methyl, ethyl, n-propyl, or isopropyl.

20. The printing medium of claim 13 wherein the polymerization reaction product constitutes from 2 to 80 percent by weight of the coating.

21. The printing medium of claim 13 wherein the thickness of the coating is in the range of from 1 to 40 μm.

22. The printing medium of claim 13 wherein the thickness of the coating is in the range of from 10 to 18 μm.

23. The printing medium of claim 13 wherein the substrate is paper, coated paper, or organic polymer.

24. A printing process which comprises applying liquid ink droplets to the printing medium of claim 13.

* * * * *